(12) United States Patent
Kempas

(10) Patent No.: US 7,324,747 B2
(45) Date of Patent: Jan. 29, 2008

(54) AIRCRAFT FUSELAGE ELEMENT AND METHOD OF TAKING A NUMBER OF PICTURES

(75) Inventor: Hagen Kempas, Überlingen (DE)

(73) Assignee: Bodenseewerk Gerätetechnik GmbH, Überlingen (DE)

( * ) Notice: Subject to any disclaimer, the term of this patent is extended or adjusted under 35 U.S.C. 154(b) by 260 days.

(21) Appl. No.: 11/025,087

(22) Filed: Dec. 29, 2004

(65) Prior Publication Data

US 2005/0178914 A1    Aug. 18, 2005

(30) Foreign Application Priority Data

Jan. 23, 2004    (DE)    .................. 10 2004 003 773

(51) Int. Cl.
*G03B 39/00* (2006.01)
*B64C 1/00* (2006.01)

(52) U.S. Cl. ...................... 396/12; 244/129.1
(58) Field of Classification Search ............ 396/7, 396/12, 13; 244/129.1
See application file for complete search history.

(56) References Cited

U.S. PATENT DOCUMENTS

| | | | |
|---|---|---|---|
| 2,410,842 A * | 11/1946 | Scholz | 396/7 |
| 3,917,199 A | 11/1975 | Dewitt | 396/13 |
| 4,498,038 A | 2/1985 | Malueg | 318/648 |
| 4,543,603 A | 9/1985 | Laurees | 348/145 |
| 4,636,044 A | 1/1987 | Loy | 359/401 |
| 5,191,370 A * | 3/1993 | Bozzolato | 396/13 |
| 5,897,223 A | 4/1999 | Tritchew et al. | 396/13 |
| 5,971,631 A | 10/1999 | Poole et al. | 396/427 |
| 5,995,758 A | 11/1999 | Tyler | 396/13 |
| 6,163,375 A | 12/2000 | Piallat | 356/601 |
| 6,533,218 B1 | 3/2003 | Jahn | 244/1 R |
| 2003/0059214 A1* | 3/2003 | Partynski et al. | 396/7 |

FOREIGN PATENT DOCUMENTS

| | | | |
|---|---|---|---|
| FR | 2608995 A1 | 12/1986 | |
| JP | 2000092357 A | 3/2000 | |
| JP | 2000134532 A | 5/2000 | |
| JP | 2001235793 A | 8/2001 | |

* cited by examiner

*Primary Examiner*—W. B. Perkey
*Assistant Examiner*—Rishi Suthar
(74) *Attorney, Agent, or Firm*—Scully, Scott, Murphy & Presser, P.C.

(57) ABSTRACT

An aircraft fuselage element (26) with a fuselage body (30) which forms an internal cavity (40) and which includes a viewing window (32, 34). To provide for taking substantially distortion-free high-resolution pictures in the infrared wavelength range and from a large angular range the fuselage body (30) is mounted for rotation about an axis of rotation (36).

6 Claims, 3 Drawing Sheets

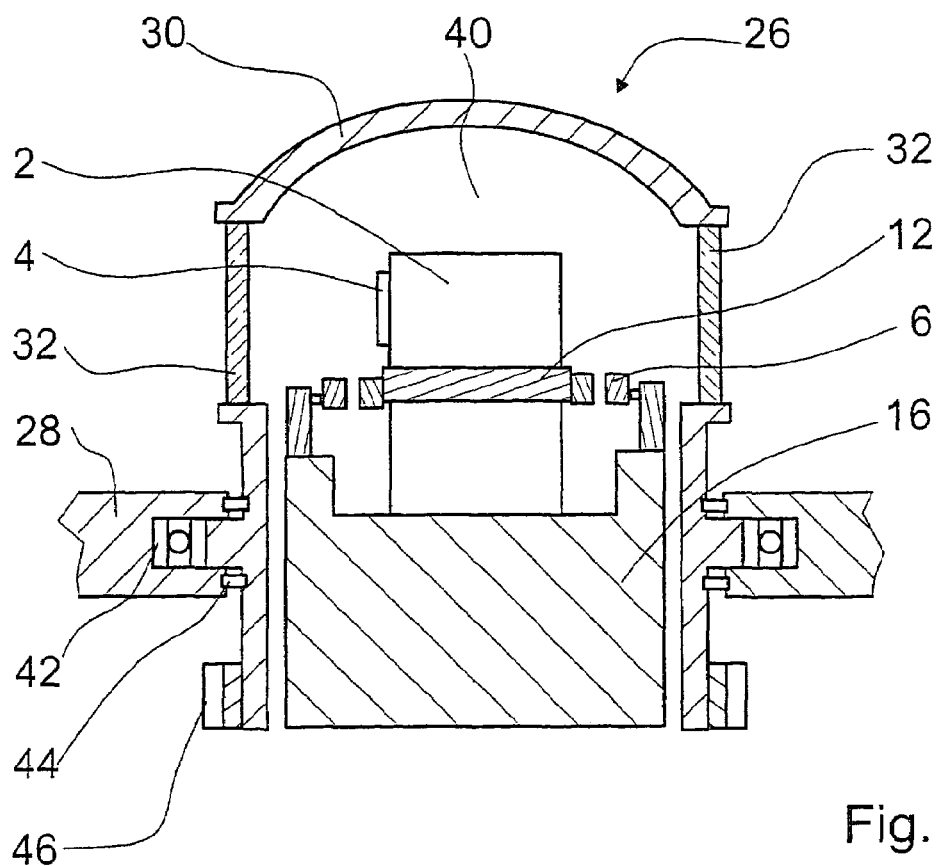
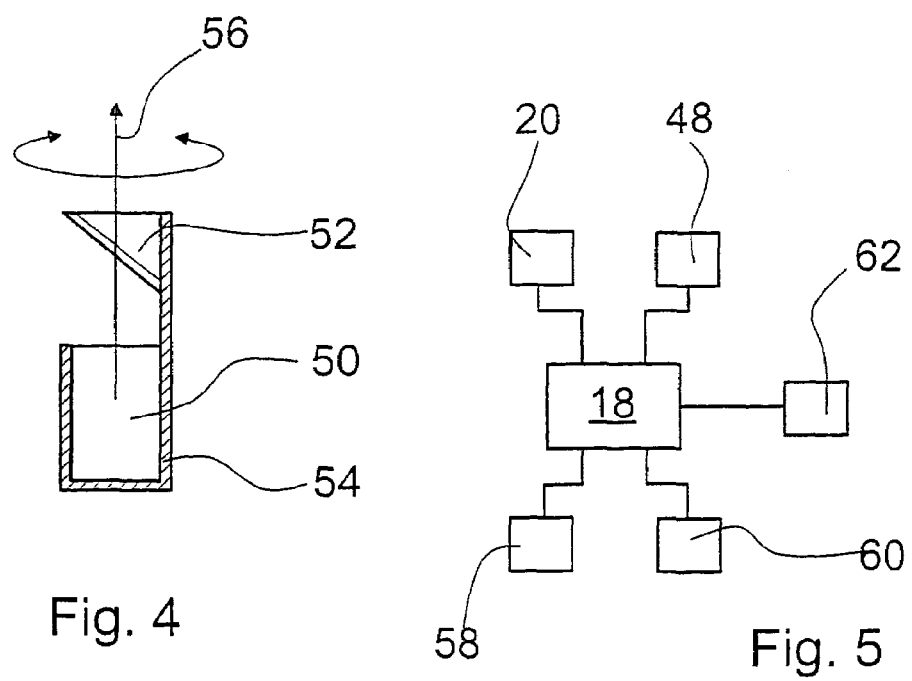
Fig. 3
Fig. 4
Fig. 5

AIRCRAFT FUSELAGE ELEMENT AND METHOD OF TAKING A NUMBER OF PICTURES

BACKGROUND OF THE INVENTION

1. Field of the Invention

The invention concerns an aircraft fuselage element with a fuselage body which forms an internal cavity and which includes a viewing window. The invention further concerns a method of taking a number of pictures of the surroundings of a camera apparatus, in which an optical element is moved into a starting position, a picture is taken through a viewing window of an aircraft fuselage element at least partially surrounding the optical element, the optical element is moved into a new position and a new picture is taken through the viewing window.

2. Discussion of the Prior Art

To take pictures from the surroundings of an aircraft, for example for the purposes of cartography of the surroundings, it is known for pictures to be taken through a viewing window in the aircraft fuselage. If wide-angle pictures of the surroundings or a number of pictures around the aircraft are to be taken, consideration is given to mounting a camera in a glass dome with a panoramic view. The production of such a dome however, particularly when it involves suitability for taking infrared pictures, is complicated and expensive. In addition the curvature of the dome housing inevitably results in optical distortion phenomena which cause difficulties in terms of image processing of high-resolution pictures.

SUMMARY OF THE INVENTION

Therefore the object of the present invention is to provide a possible way of taking high-resolution pictures from an aircraft in a better fashion.

That object is attained by an aircraft fuselage element of the kind set forth in the opening part of this specification, in which the fuselage body is mounted rotatably about an axis of rotation.

The invention is based on the consideration that, to take high-resolution pictures from an aircraft, it is absolutely essential for a recording camera apparatus to be decoupled from the movement of the aircraft. When decoupling of the movements of the camera and the aircraft is involved, the camera is also moved relative to a glass dome. That relative movement results in the movements of optical distortion phenomena in the pictures taken, which can only be eliminated with very great difficulty.

The disadvantage of the optical distortion phenomena and the high level of manufacturing expenditure for a glass dome can be obviated by a viewing window comprising a number of plane-parallel individual panes, whereby a panoramic view for the camera apparatus is also achieved. The transitions between the individual panes however inevitably give rise to optical loss due to shadowing and pupil division. If the number of individual panes is reduced then the size of the individual panes increases and the angle of incidence of the radiation becomes correspondingly greater, in which respect a problem in terms of reflection compensation occurs, in particular in the case of a camera apparatus for use in the infrared range. In addition the technical expenditure involved in producing a facet window with infrared transmission for an optical system designed at the diffraction limit is considerable.

The invention is further based on the consideration that the disadvantage of a facet window can be avoided if the viewing window is formed from a single window, for example a single plane-parallel pane, which can be entrained with a movement of the camera apparatus. In that way the pictures which are taken in various directions are always taken through the same viewing window. Such mobility of the viewing window can be attained if it is arranged in a fuselage body which is mounted rotatably about an axis of rotation. An aircraft fuselage element with such a fuselage body and viewing window is optically substantially distortion-free, robust, simple and inexpensive to produce.

An aircraft fuselage element is an element which is provided to form a part of the outer fuselage casing of the aircraft. Besides the fuselage body it can include a motor, a control or a bearing arrangement, relative to the outer bearing shell of which the fuselage body is rotatable. The fuselage body is provided for rotatable mounting, for example insofar as it carries a bearing or is adapted for being held in or on a bearing. The fuselage body can be hemispherical, cylindrical with or without a cover or at least partially spherical. It is also possible for the fuselage body to be of a spherical configuration at least over some degrees of width and for it to be two-dimensionally movably mounted in spherical co-ordinates. An axis of rotation of the fuselage body is desirably arranged outside the viewing window so that pictures can be taken over a wide angular range. It will be appreciated that the viewing window is also rotatable in the outwardly closed condition so that, upon rotation of the viewing window, the camera apparatus remains protected from external forces.

Advantageously the fuselage body is mounted rotatably through 360°. That permits a panoramic view through the viewing window. The term mounting rotatable through 360° is used to denote that the viewing window is mounted in such a way that the viewing window is rotatable completely about the axis of rotation. That term is also used to denote a complete conical viewing range.

A further advantage of the invention is attained by at least two viewing windows which are mounted rotatably about a common axis of rotation. It is possible for a camera to take pictures successively through the two viewing windows, whereby it is possible to avoid follower tracking movement of the viewing window with a large pivotal movement of the camera or an optical element of the camera. It is also possible for two cameras to take pictures through the two viewing windows at the same time.

In particular for taking high-resolution pictures the viewing window desirably includes a plane-parallel viewing pane. That makes it possible to achieve a substantially distortion-free view through the viewing window.

The invention further proposes an optical system with an aircraft fuselage element as described hereinbefore, which includes an optical element arranged in the internal cavity. High-resolution pictures can be taken in a substantially distortion-free fashion through the movable viewing window, by means of the optical element. The system serves to take pictures of the surroundings of the system, in which respect the optical element can be a camera, a lens or a mirror. If the internal cavity is arranged to project at least partially beyond the surrounding outside fuselage casing of the aircraft, that makes it possible to enjoy a panoramic view on the part of the optical element through the viewing window.

The optical element is advantageously mounted rotatably independently of the fuselage body. That can provide for simple control for the movement of the fuselage body and the expenditure and complication in terms of moving the fuselage body can be kept low. A high level of acceleration of a possibly light optical element can be decoupled from acceleration of the fuselage body. In particular, the fuselage body is mounted rotatably about a first axis and the optical element is mounted rotatably about a second axis which is movable independently of the first axis. The mounting arrangement for the fuselage body can remain simple, in regard to a demanding movement on the part of the optical element. The optical element for example can be cardanically supported.

A further advantage is achieved if the optical system includes a control device which is adapted to control a movement of the optical element and the fuselage body, with the movements being related to each other. The optical element can be caused to track a movement of the viewing window and vice-versa without that involving particular mechanical complication and expenditure.

Desirably the control device is adapted for continuous rotation of the fuselage body with simultaneous stepwise rotation of the optical element. The possibly heavy fuselage body can in that way be moved at a low level of acceleration, in particular uniformly, while the optical element can come to a stop to take a picture. While the picture is being taken the fuselage body continues to rotate. In that arrangement the viewing window is advantageously larger than the entry aperture of the optical element.

The invention further proposes that the optical system includes a camera device for taking a picture, wherein the control device is provided for the control of moving the optical element into a starting position, taking a picture through the viewing window, subsequently moving the optical element into a new position, moving the viewing window in entrained relationship with the optical element and again taking a picture through the viewing window. A succession of pictures can be taken in different directions through a relatively small viewing window. In that situation the entrainment effect is such that the pictures can be taken through the entrained viewing window. The movement can be synchronous or mutually decoupled.

It is further proposed that the control device is provided for the control of taking a picture through the viewing window, controlling a return movement of the optical element into the starting position and again taking a picture through a further viewing window. A possibly relatively heavy fuselage body does not in that way have to be entrained with a return movement of the optical element and only has to be oriented in such a fashion that the further viewing window allows a picture to be taken from the starting position.

In addition the above-specified object is attained by a method of the kind set forth in the opening part of this specification in which in accordance with the invention the viewing window is entrained with the movement of the optical element from the starting position into the new position. It is possible to achieve substantially distortion-free taking of high-resolution pictures over a wide angular range of the surroundings at a relatively low level of manufacturing expenditure and complication in respect of the aircraft fuselage element. Entrainment can take place synchronously or in mutually decoupled relationship.

BRIEF DESCRIPTION OF THE DRAWINGS

Further advantages will be apparent from the specific description hereinafter. Embodiments of the invention are illustrated in the drawing. The drawing, the description and the claims set forth numerous features in combination. The man skilled in the art will appropriately also consider the features individually and combine them to form further suitable combinations.

In the drawing:

FIG. 3 shows a sectional view through the aircraft fuselage element,

FIG. 4 shows a diagrammatic sectional view through a further camera apparatus, FIG. 5 shows a schematic circuit diagram with a control device.

DETAILED DESCRIPTION OF THE INVENTION

Figure 1:
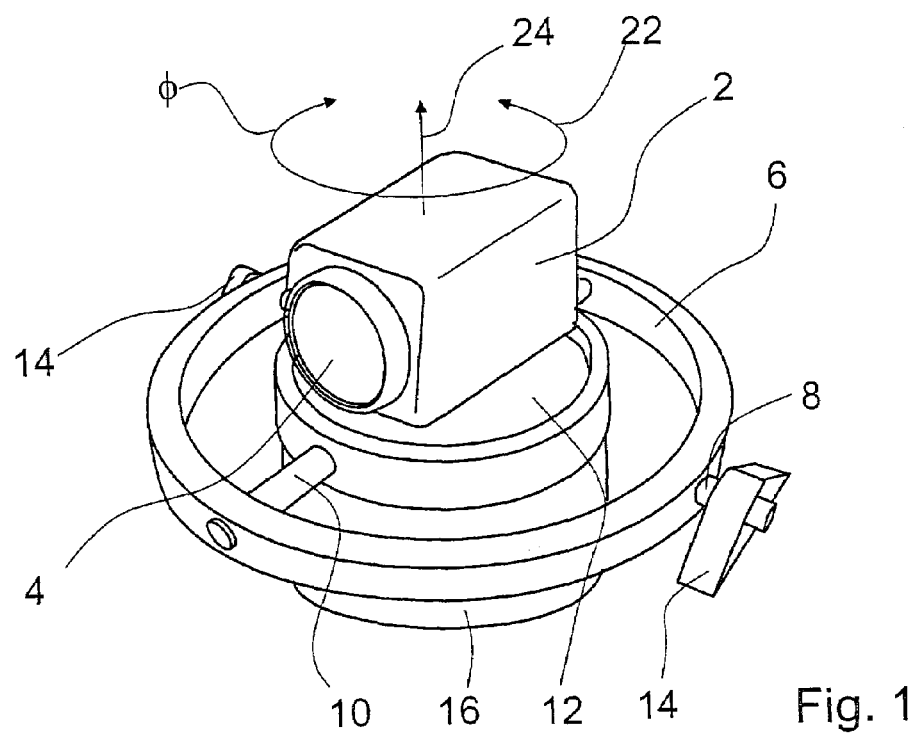
FIG. 1 shows a camera apparatus in a cardanic frame system.

FIG. 1 shows a camera apparatus 2 for taking pictures through an optical element 4 in the form of a lens. The camera apparatus 2 is mounted in a cardanic frame system 6 which includes two axes of rotation 8, 10 which are arranged in mutually perpendicular relationship and which two-dimensionally rotatably hold a turntable 12. The camera apparatus 2 is fixed on the turntable 12. The frame system 6 is fixed by means of two fixing elements 14 in an aircraft (not shown). The turntable 12 is connected to a movement device 16 which is movable by means of a control device 18 (FIG. 5) and a motor drive 20. The turntable 12 is mounted in such a way that it can be decoupled from minor movements of the aircraft. In addition the turntable 12 is rotatable completely about an axis of rotation 24 in one direction 22 of rotation.

Figure 2:
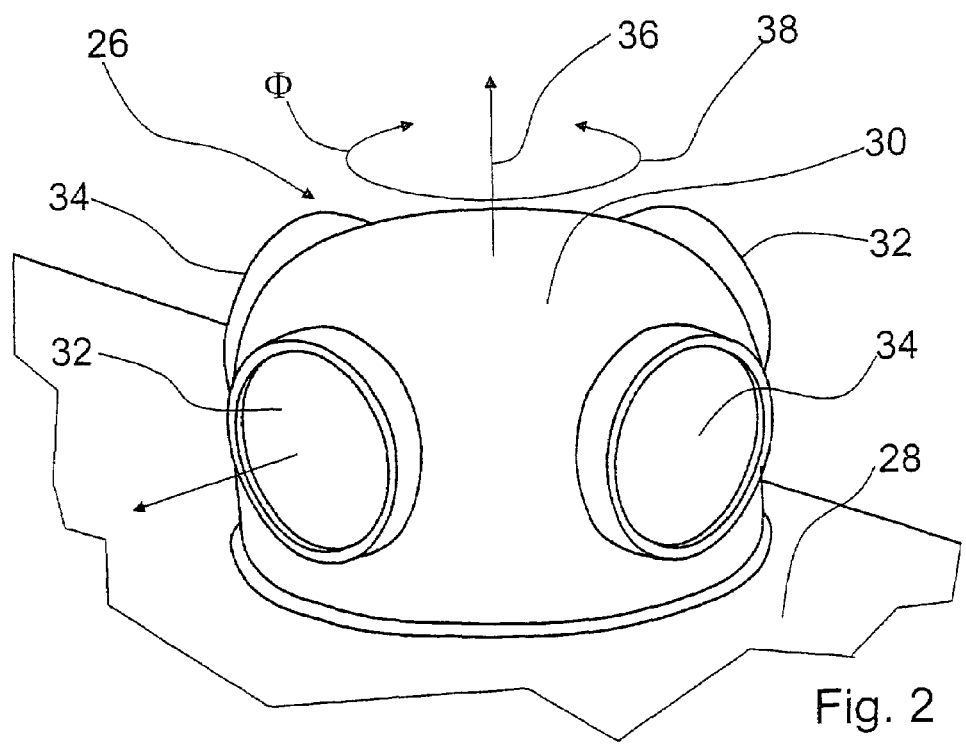
FIG. 2 shows a perspective view of an aircraft fuselage element.

FIG. 2 shows an aircraft fuselage or casing element 26 which projects out of a surrounding aircraft fuselage segment 28. The aircraft fuselage element 26 includes a metal dome-shaped fuselage body 30 in which four viewing windows 32, 34 are arranged. The viewing windows 32, 34 are made from a strong material which is transparent for light in an infrared wavelength range. The viewing windows 32, 34 are of plane-parallel nature and are of a round configuration at their periphery. The fuselage body 30 is mounted rotatably about an axis of rotation 36 in the direction 38 of rotation, the axis of rotation 36 occupying a fixed direction in relation to the aircraft fuselage segment 28. The axis of rotation 24 of the camera apparatus 2 is movable with respect to the axis of rotation 36 of the fuselage body 30 by virtue of the cardanic frame system 6 and the movable turntable 12.

The aircraft fuselage element 26 is shown in a diagrammatic sectional view in FIG. 3. The fuselage body 30 in part encloses an internal cavity 40 in which the diagrammatically illustrated camera apparatus 2 is arranged. The optical element 4 is aligned in relation to the viewing window 32 so that the camera apparatus 2 is ready to take pictures from the surroundings of the aircraft fuselage element 26 through the viewing window 32. At its end which is the lower end in FIG. 3, the aircraft fuselage element 26 includes a bearing 42 with which the fuselage body 30 is mounted rotatably within the aircraft fuselage segment 28. To seal off a gap, two sliding sealing elements 44 are disposed between the fuselage body 30 and the aircraft fuselage segment 28. Fixed to the base of the fuselage body 30 is a gear 46 into which engages a gear (not shown) of a drive motor 48 (FIG. 5).

FIG. 4 shows an alternative camera apparatus 50 with an optical element 52 in the form of a mirror. The camera apparatus 50 is mounted in a frame 54 which is suspended cardanically in an aircraft. The frame 54 and therewith the camera apparatus 50 and the optical element 52 are arranged rotatably about an axis of rotation 56. With this embodiment of the camera apparatus 50, it is possible for only the optical element 52 to be arranged within an internal cavity of a fuselage body of an aircraft fuselage element, whereby that fuselage body can be very small and can be designed to project little beyond an aircraft fuselage segment. In an alternative configuration only the optical element 52 is rotatable whereas the camera apparatus 50 is fixed.

FIG. 5 shows a schematic circuit diagram with the control device 18, the drive 20 for moving the turntable 12 and a drive motor 48 for the rotatable drive of the fuselage body 30. Two sensors 58, 60 are also connected to the control device 18, wherein the sensor 58 is provided for detecting a rotary angle φ of the camera apparatus 2 and of the optical element 4 and the sensor 60 is provided for detecting a rotary angle Φ of the fuselage body 30 relative to a rotary angle zero point of a system giving the rotary angle zero point, for example a gyro system. The control device 18 is also connected to a further control device 62 which contains data relating to movements of the aircraft and to pictures to be taken.

Figure 6:
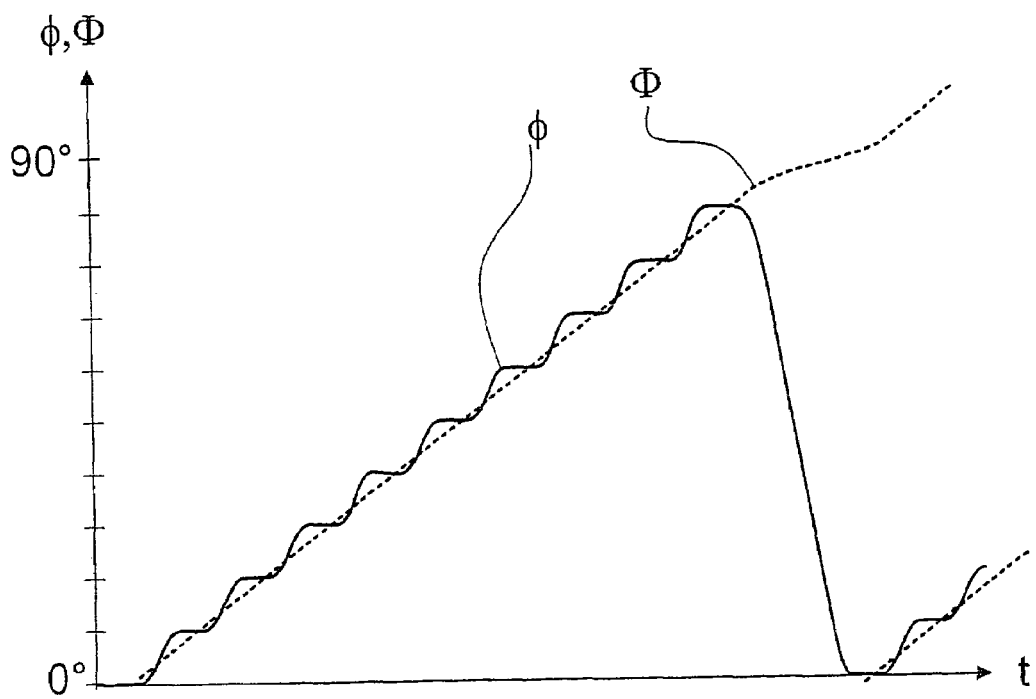
FIG. 6 is a graph showing the angle of rotation of an optical element and a viewing window in relation to time.
Figure 7:
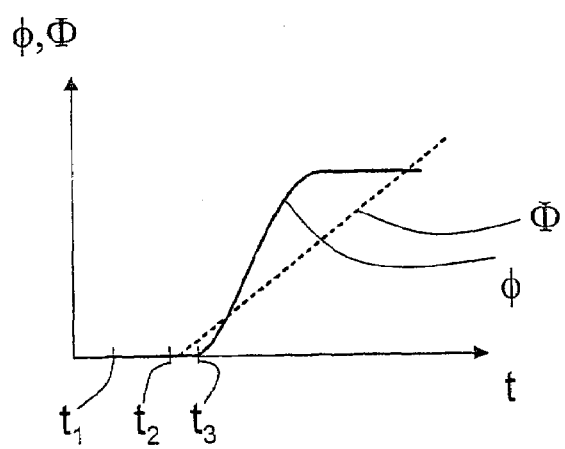
FIG. 7 shows a detail view from FIG. 6.

FIG. 6 is a diagrammatic graph showing the rotary angles φ and Φ of the camera apparatus 2 and the fuselage body 30 respectively while a number of pictures is being taken, in relation to the time t. FIG. 7 shows a portion from FIG. 6 on an enlarged scale. At a time $t_1$ the optical element 4 is arranged in a starting position which is indicated in FIGS. 6 and 7 with φ=0°. Between the times $t_1$ and $t_2$ the starting position of the optical element 4 is checked by the control device 18 and it is established that the optical element 4 is inertially stabilised, that is to say for example is in the constant angular position φ=constant. Apart from a possible residual error in respect of the stabilisation movement by way of the cardanic suspension of the turntable 12 the optical element 4 is thus at rest. At the time $t_2$ the control device 18 enables the camera for taking a first picture 64 which is taken by the camera apparatus 2 through the viewing window 32 of the fuselage body 30. From the time $t_2$ to the time $t_3$ that first picture 64 is exposed for about 25 ms.

After termination of the exposure the movement device 16 is actuated in such a way that the turntable 12—and therewith the camera apparatus 2 and the optical element 4—is rotated through an angle of φ=9°. In a similar manner to prior to exposure of the first picture 64, the control device 18 now again checks the rest position of the optical element before the system is enabled for taking a second picture 64. After the second picture 64 is taken the optical element 4 is again rotated through 9° and a third picture 64 is taken. In that way, a total of ten pictures 64 are taken after each rotational movement of 9° in each case, the optical element 4 being arranged at an angular position φ=81° while the tenth picture 64 is being taken.

Figure 8:
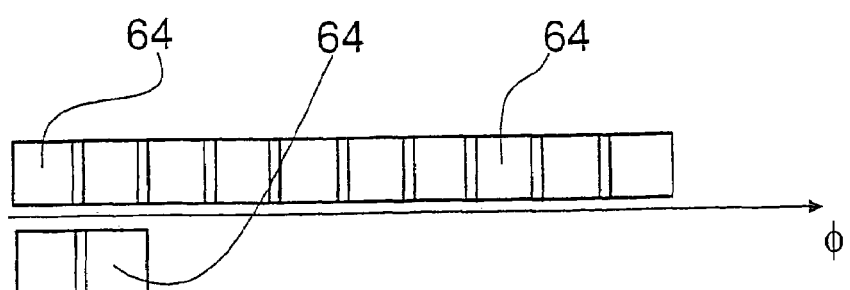
FIG. 8 shows diagrammatically illustrated pictures taken, over an angular range.

The ten pictures 64 taken are illustrated diagrammatically in FIG. 8. They each form a respective angular portion of 10°×10° from the surroundings of the aircraft fuselage element 26 and each overlap by 1° respectively in the direction of rotation 22. While the ten pictures 64 are being taken the viewing window 32 is caused to track the optical element 4 in a continuous rotary movement (broken line) so that the rotary angle Φ of the fuselage body 30 and the viewing window 32 respectively rises linearly. The size of the viewing windows 32, 34 is so selected in that arrangement that, during the entire exposure time of the pictures 64, there is no shadowing effect due to the viewing window edges or frame on the pictures 64. The diameter of the viewing windows 32, 34 is about 15 cm wherein a picture of the size of 15°×15° could be taken with the camera apparatus 2 through the viewing window 32. When a picture is being taken, the beam path extends almost perpendicularly through the plane-parallel viewing windows 32, 34, whereby optical distortion can be kept very slight. The continuous speed of rotary movement of the viewing windows 32, 34 does not result in any optical aberration worth mentioning during the picture-taking process.

After the tenth picture 64 has been taken at the angular position φ=81° the camera apparatus 2—and therewith the optical element 4—is pivoted back into the starting position φ=0°. After the starting position is reached and after the expiry of a checking time as described hereinbefore by the control device 18, an eleventh picture 64 is taken by the camera apparatus 2. While the eleventh picture 64 is being taken the viewing window 32 reaches the angular position Φ=90°. As the viewing windows 32, 34 are arranged displaced from each other through Φ=90°, the viewing window 34 is now in the position Φ=0°. The eleventh picture 64 is thus taken through the viewing window 34.

As the return pivotal movement of the optical element 4 from the angular position φ=81° into the starting position takes some time, the rotary movement of the fuselage body 30 is braked somewhat during that period so that the viewing window 34 moves into the position Φ=0° during exposure of the eleventh picture 64. Now the eleventh picture 64 and then the twelfth to twentieth pictures 64 are taken in a similar manner as described hereinbefore in relation to the first ten pictures 64.

In order to avoid the slight discontinuity in the uniform rotary movement of the fuselage body 30 it is also possible to take only nine pictures 64 in the direction of rotation 22 and to use the time of the tenth picture 64 for return pivotal movement of the camera apparatus 2. It would also be possible to provide only three viewing windows 32, 34 in the fuselage body 30 so that, after pictures 64 have been taken over an angular range Φ=90°, there would still be some time available for the return pivotal movement until the subsequent viewing window 34 moves into the starting position Φ=0°.

REFERENCES 2 camera apparatus
4 optical element
6 frame system
8 axis of rotation
10 axis of rotation
12 turntable
14 fixing element
16 movement device
18 control device
20 drive
22 direction of rotation
24 axis of rotation
26 aircraft fuselage element
28 aircraft fuselage segment
30 fuselage body
32 viewing window
34 viewing window 36 axis of rotation
38 direction of rotation
40 internal cavity
42 bearing
44 sliding sealing element
46 gear
48 drive motor
50 camera apparatus
52 optical element
54 frame
56 axis of rotation
58 sensor
60 sensor
62 control device
64 picture
φ angle of rotation
Φ angle of rotation

The invention claimed is:

1. An optical system with an aircraft fuselage element (26), which is built into an aircraft fuselage segment (28), including a fuselage body (30) which has an internal cavity (40) and which includes at least one viewing window (32, 34), wherein:
   a) the fuselage body (30) is mounted for rotation through an angle of 360° about a first axis of rotation (36), and an optical element (4, 52) is arranged in the internal cavity (40);
   b) the optical element (4, 52) is mounted so as to be rotatable independently of the fuselage body (30) about a second axis of rotation (24), which extends parallel to the first axis of rotation (36); and
   c) wherein a control device (18) controls movement of the optical element (4, 52) and the fuselage body (30), and wherein the movements are coordinated with each other.

2. The optical system according to claim 1, wherein the control device (18) provides for a continuous rotary movement of the fuselage body (30) with a simultaneous stepwise rotary movement of the optical element (4, 52).

3. A method of taking a number of pictures (84) with an optical system according to claim 1, wherein a camera apparatus (2, 50) takes pictures (64) of a surrounding region, and in which:
   a) the optical element (4, 52) is moved to a starting position;
   b) a picture (64) is taken through the at least one viewing window (32, 34);
   c) the optical element (4, 52) is subsequently moved into a new position, whereby the at least one viewing window (32, 34) is concurrently moved into the new position; and
   d) a new picture (64) is taken through the viewing window (32, 34).

4. The method of taking a number of pictures (64) according to claim 3, wherein:
   a) subsequent to taking a picture (64) through the at least one viewing window (32, 34), the optical element (4, 52) is returned into a starting position; and
   b) another picture (64) is taken through a further viewing window (32, 34).

5. The optical system according to claim 1, wherein at least two said viewing windows (32, 34) are mounted for common rotation about said first axis of rotation (36).

6. The optical system according to claim 1, wherein at least one viewing window (32, 34) includes a plane-parallel pane.

* * * * *